(12) United States Patent
Holloway

(10) Patent No.: US 6,681,521 B1
(45) Date of Patent: *Jan. 27, 2004

(54) SEED GERMINATION MEDIUM

(75) Inventor: David H. Holloway, Sherman-on-Loddon (GB)

(73) Assignee: Terraseed Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/959,559

(22) PCT Filed: May 5, 2000

(86) PCT No.: PCT/GB00/01599

§ 371 (c)(1),
(2), (4) Date: Feb. 27, 2002

(87) PCT Pub. No.: WO00/67549

PCT Pub. Date: Nov. 16, 2000

(30) Foreign Application Priority Data

May 5, 1999 (GB) ................................ 9910346

(51) Int. Cl.⁷ .................................................. A01C 1/04
(52) U.S. Cl. ............................................................ 47/56
(58) Field of Search ........................................ 47/56, 9

(56) References Cited

U.S. PATENT DOCUMENTS

| | | | | |
|---|---|---|---|---|
| 2,826,865 A | * | 3/1958 | Chohamin | 47/56 |
| 2,909,003 A | * | 10/1959 | Marshall | 47/56 |
| 4,118,890 A | * | 10/1978 | Shore | 47/29.3 |
| 5,171,683 A | * | 12/1992 | Kertz | 435/430 |
| 5,189,833 A | * | 3/1993 | Clark | 47/56 |
| 5,205,068 A | * | 4/1993 | Solomou | 47/56 |
| 5,417,010 A | * | 5/1995 | Ecer | 47/56 |
| 5,739,005 A | | 4/1998 | Rodriguez-Kabana et al. | 340/605 |
| 6,389,745 B1 | * | 5/2002 | Huh | 47/56 |
| 6,446,386 B1 | * | 9/2002 | Holloway | 47/56 |

FOREIGN PATENT DOCUMENTS

| | | | |
|---|---|---|---|
| CH | 604 471 | | 12/1977 |
| CH | 604471 | * | 9/1978 |
| DE | 38 44 418 | | 11/1989 |
| FR | 2 534 444 | | 4/1984 |
| FR | 2 769 855 | | 4/1999 |
| GB | 1566161 | | 4/1980 |
| GB | 2217164 A | * | 10/1989 |
| JP | 3-119927 | * | 5/1991 ............ A01G/1/00 |
| JP | 10-136712 | * | 5/1998 |
| WO | WO 98/53659 | | 12/1998 |

* cited by examiner

Primary Examiner—Peter M. Poon
Assistant Examiner—Jeffrey L. Gellner
(74) Attorney, Agent, or Firm—Blank Rome LLP

(57) ABSTRACT

This invention provides a seed germination medium comprising an upper layer formed from a tissue paper having a weight of approximately 10–30 g/m², the tissue paper being coated or impregnated with a waterproofing agent such that the tissue paper is permeable to gases but substantially impermeable to water in liquid form; a lower layer formed from a water-absorbent biodegradable material; seeds being disposed beneath the upper layer; and the upper layer optionally having a plurality of perforations therein to assist disruption of the upper layer to enable seedlings germinating from the seeds to grow therethrough.

15 Claims, 4 Drawing Sheets

SEED GERMINATION MEDIUM

This invention relates to a seed germination medium for encouraging the germination and establishment of seeds, especially in hostile environments, where water, nutrients, climate, chemical contamination and soil conditions may be limiting factors.

BACKGROUND OF THE INVENTION

Desertification, salination and soil erosion are significant and increasing problems in many parts of the world. They are typically caused by climatic change, rapidly increasing population, shortage of water and loss of agricultural land to development. This process often places unprecedented pressure for increased productivity from a diminishing and non-renewable land resource. This often leads to contamination of the soil with salts (from contaminated irrigation water, ground water, and fertiliser use) which eventually makes it impossible to grow food or even cover crops. This in turn accelerates soil degradation and leads to desertification.

One of the few ways to reverse salination is to irrigate contaminated soils with clean water to wash-out the saline contaminants. This is often not possible due to the lack of pure water. An alternative is to establish salt tolerant species (e.g. pistachio, barley and sugar beet), then to minimise water use, and subsequently to 'soak-up' salts in the harvested crops. This is a gradual process which will allow a wider range of less tolerant crops to be grown in the longer term.

Various proposals have been made for providing seed germination media which provide the seeds with water, nutrients and protection during the germination phase.

U.S. Pat. No. 5,189,833 discloses an arrangement in which lawn grass seeds are germinated in a thin layer of growing medium sprayed over a mat of non-woven polypropylene lying on top of an impermeable membrane. After a few days of germination, the mat carrying the seed-bearing medium can be lifted, rolled and then spread over an appropriately conditioned and prepared lawn bed. It will be appreciated that such an arrangement is neither intended nor suitable for growing crops in adverse environmental conditions.

Australian Patent Application AU-A-81394/75 discloses a seed bearing mat comprising upper and lower layers bonded together with a latex adhesive, seeds being bonded between the layers. The lower layer is a water permeable material such as straw, coconut fibres, peat moss or wood shavings whilst the upper or covering layer is formed from materials of a finer texture than the lower layer such as coconut fibre dust or sawdust bonded together by latex. The seed bearing mat of AU-A-81394/75 is described as being particularly useful in preparing lawns.

French Patent Application FR-A-2505607 discloses a non-laminar seed germination medium comprising a folded layer of a transparent plastics material such as polyethylene having bonded to the edges of the underside thereof a water-soluble or degradable seed-bearing medium such as paper. In use, the seeds germinate beneath the transparent plastics layer and, as the seedlings grow, they lift the transparent layer away from the water-soluble/degradable medium. Thus the transparent layer is gradually unfolded and carried upwards by the growing seedlings and therefore remains in place over the top of the plants to maintain a greenhouse effect.

French Patent Application FR-A-2440438 discloses a peat-based seed bearing medium comprising a lower layer formed of a water-permeable fibrous material such as cellulose fibres or muslin cloth, an intermediate layer of peat containing seeds and any additives; and optionally an upper layer which is also water-permeable and can be formed from a material such as muslin. Although FR-A-2440438 discloses that the media are envisaged as being economical for large scale use such as plantations in and regions e.g deserts, it is also emphasised that an advantage of the peaty medium, compared with polyethylene sheets, is that it allows the penetration of rain water.

International Patent Application WO-A-96/28010 discloses a seed germination medium in sheet form having upper and lower layers and seeds disposed therebetween. The upper and lower layers are preferably formed from a biodegradable paper material. In order to assist anchoring of the medium in the underlying soil or, in the case of desert areas, sand, the medium is slit longitudinally to enable it to be stretched laterally to form an open lattice. However, it has been found that a problem with the lattice arrangement disclosed in WO-A-96/28010 is that it has a tendency to dry out too quickly. In particular, when stretched to open out the lattice, the edges of the lattice openings lift exposing the lower layer of the medium and increasing water loss. Also, the lifting of the edges of the lattice results in the seeds being lifted away from the soil which acts to inhibit germination of the seedlings, possibly through build up of ethylene in the medium.

SUMMARY OF THE INVENTION

It is an object of the present invention to provide a seed germination medium which avoids the problems inherent in many known media and which enables seeds to be germinated effectively in a range of different types of environment, particularly arid and semi-arid areas and areas in which soil salination and desertification has taken hold. A further object of the invention is to provide a means of assisting germination and development of seedlings in land contaminated with organic and inorganic materials such as solvents and heavy metals.

Accordingly, in a first aspect, the invention provides a seed-germination medium comprising an upper layer formed from a tissue paper having a weight of about 10 to 30 g/m$^2$, the tissue paper being coated or impregnated with a waterproofing agent such that the tissue paper is permeable to gases but substantially impermeable to water in liquid form; a lower layer formed from a water-absorbent biodegradable material; seeds being disposed beneath the upper layer, and the upper layer optionally having a plurality of perforations therein to assist disruption of the upper layer to enable seedlings germinating from the seeds to grow therethrough.

Although the term "seed germination medium" is used above and in the claims appended hereto, the terms "seed matrix" and "seed mat" are also used in the specification, and such terms are intended to be synonymous with "seed germination medium" unless the context indicates otherwise.

The seed germination media of the invention are of a laminar construction, and typically comprise layers bonded together in such a manner that the layers cannot readily be separated without destroying them. In this respect, the media are distinguished from the media disclosed in FR-A-2505607 which are of a non-laminar arrangement in which the upper and lower sheets are connected only at their respective edges such that the upper sheet can be lifted away from the lower sheet by the action of the growing plant.

The upper layer optionally has a plurality of perforations therethrough through which seedlings may grow. Such perforations are preferred when the seedlings are of a more delicate or less robust nature and/or are insufficiently strong to force their way through the upper layer. However, where the seedlings are of a more robust nature, and are sufficiently strong to burst through the upper layer, the perforations may be omitted.

The lower layer can also be provided with a plurality of perforations to enable roots emerging from the seeds to grow therethrough.

The coated or impregnated tissue paper from which the upper layer is formed should be partially permeable to water vapour but should nevertheless provide some barrier properties with respect to water vapour. A major function of the upper layer is to minimise loss of water from the medium through evaporation, and to hold seeds in position when exposed to wind, rain or harsh irrigation.

The term "tissue paper" paper as used herein refers to a lightweight material with relatively poor mechanical strength typically having a weight of approximately 10 to 30 $g/m^2$, more usually 15 to 25 $g/m^2$, for example from 17 $g/m^2$ to 24 $g/m^2$. The tissue paper typically has sufficient mechanical strength to enable it to remain intact during manufacture and laying but is preferably sufficiently weak when wet to allow stronger seedlings to grow through. For stronger grades of tissue paper, for example papers at the upper ends of the weight ranges set out above, perforations may be present in the upper layer to assist the growth of seedlings, particularly where the seedlings are of insufficient strength to burst or "punch" though the tissue.

The tissue paper can be calendered to give a polished surface and an example of such a calendered paper is sulphite paper available from Kruger Tissue, Church Stretton, Shropshire, UK.

In order to provide the necessary waterproofing properties, the tissue paper can be coated with a waterproofing material such as a wax or gas permeable polymeric coatings In general, the coating of waterproofing agent is relatively thin, for example less than about 10 microns thick. The thin layer of waterproofing material is chosen so as to give waterproofing properties for a short period of time until the seedling establishes itself, but contributes relatively little if at all to the strength of the tissue. Examples of waterproofing polymers include bioerodible polymers and/or polymers which hydrolyse of otherwise break down slowly in the presence of water, air, ultraviolet light or heat, or under the action of microbial attack In an alternative embodiment, the tissue paper can be impregnated with a waterproofing material, for example a waterproofing adhesive (such as "Mystolene PS" available from Catomance PLC, UK) which can consist of or contain a waterproofing polymer as hereinbefore defined.

The upper and lower layers are typically bonded together by means of an adhesive. The adhesive is typically one which is non-phytotoxic, and most preferably is water-based. Examples of such adhesives are starch, starch derivatives, polyvinyl alcohol (PVA) and ethylene vinyl acetate (EVA), optionally in combination with other adhesives. The adhesive can be applied in such a manner and in such an amount that it permeates the upper layer thereby providing waterproofing properties to the upper layer. Where the adhesive itself in of insufficient waterproofing capability, a waterproofing agent can be added to the adhesive. The adhesive is preferably one which is biodegradable or bioerodible.

The lower layer is an absorbent layer which can be made from a wide range of biodegradable materials including air-laid paper e.g. an air-laid latex bonded paper, for example a paper formed from fluff pulp and a latex binder; waste or recycled paper, or other fibre-based or waste products. The selection of a suitable absorbent material for the lower layer will be dependent on cost, availability of raw materials and water for irrigation; the soil type, irrigation method, degree of capillarity required and the amount of water which must be retained in the medium to facilitate establishment of the seedling. In one preferred embodiment, 38–150 $gm/m^2$ air-laid paper is used to form the lower layer, one such form of material being available from Walkisoft of Steinfurt, Germany. Such air-laid papers typically contain approximately 85% fluff pulp and 15% latex binder, although greater or lesser amounts of binder can be used as desired. Where availability of water is not a limiting factor, the lower layer may be relatively non-absorbent, e.g. may be formed from newsprint or other recycled material.

The lower layer can be a single layer or it can comprise a plurality, e.g. two, three or four, of layers. As with the upper layer, the lower layer can be perforated to assist the penetration of roots emerging from the seeds, although with plants exhibiting strong root growth, this may be unnecessary. The upper and/or lower layer can advantageously be coloured or treated to manipulate climatic conditions (e.g. to absorb or reflect heat) and to suppress weed growth below the medium. For example, the medium, or at least the surfaces thereof, can be provided in a variety of colours to assist soil warning/cooling or to exclude light so as to suppress weed growth and aid plant establishment. The medium may have different colours on its upper and lower surfaces to enhance or reduce the absorption of radiation on one surface and produce the opposite effect on its other surface.

In order to maximise weed suppression, the perforations in the upper and lower layers are preferably not in register, thereby ensuring that the medium cannot be expanded to form a lattice in the manner disclosed in WO-A-96/28010, and hence preventing weeds growing through. The perforations can be slits or holes of any shape but, in the upper layer, preferably they are in the form of slits. The upper and lower layers can have different numbers of perforations, and the perforations in the respective layers can be of the same general shape or a different shape. In general, the placement and size of the perforations and cuts will be dependent upon seed size, shape and type.

In addition to the seeds, a range of optional materials can be disposed beneath the upper layer.

For example, fertilizers, micro-nutrients (such as zinc, copper, boron, and seaweed extracts), vitamins, humic acid, sea kelp, sugars, amino acids, plant growth promoters and hormones, pH-regulators such as lime and sulphur, salt binding agents such as gypsum (calcium sulphate) and adsorbents such as activated carbon can be incorporated into the medium either by formulating with the adhesive or by application directly to one or other of the internal surfaces as a spray, granule or dust. The pH-controlling agents can be used to control the acidity of the immediate environment, and agents such as gypsum and activated charcoal can minimise the impact of adverse chemical contaminants and salt in the soil or medium, as well as to improve germination, and/or to aid and accelerate plant establishment. Salt binding compounds, buffering and pH regulating compounds and adsorbents typically are applied at between about 20 gsm and 200 gsm, more usually 50 to 150 gsm, for example approximately 100 gsm. In the case of the adsorbent, activated carbon, lower concentrations are typically used.

The buffering and other chemical organic agents provide a means of counteracting the impact of adverse chemical contaminants in the soil or medium, as well as improving germination, and/or aiding and accelerating plant establishment. Thus, for example, lime provides a buffer against low pH, gypsum provides a means of counteracting high salinity, whereas clay minerals such as zeolite, kaolinite, calcium bentonite and montmorillonite counteract high levels of fertiliser or chemical contamination in the soil.

Fertiliser and micronutrients may be added to the medium either by incorporation with the adhesive or applied directly to one or other of the internal surfaces as a spray, granule or dust. If applied at high levels, fertilisers will produce a high level of EC (electro-conductivity) in the medium, which will scorch and kill emerging seedlings. Consequently the rate of application, the type of fertiliser used and the rate of release generally require careful control. Typically, organic based fertilisers are used since such fertilisers release nitrogen more slowly allowing higher rates to be included in the medium without risk of damage to seedlings. A typical application would be of a granular, organic-based material at between 10 and 100 grammes per square meter (gsm), more typically 30–80 gsm. Fertilisers can vary considerably in their potassium, phosphorus and nitrogen contents, but one fertiliser useful in the media of the invention contains 16% nitrogen, 10% phosphorous and 10% potassium plus micro-nutrients.

Water retaining substances and wetting agents, which can be synthetic or natural materials (such as clay minerals, e.g sodium bentonite (which can be applied at up to 100 gsm), or gelatine products, or surf such as non-ionic, anionic, cationic and amphoteric surfactants or other wetting adjuvants), can be included to increase the water absorbency of the medium. Examples of such water-retaining substances include polymeric gels such as polyoxyethylene gels (PEO), silica gels and so-called "super absorbents" such as super absorbent acrylic polymers (e.g. polyacrylamide), which may be added to the medium at between 5 and 100 gsm, preferably 10 to 40 gsm, for example up to about 30 gsm depending on use. Polyacrylamide is available for agricultural use from a range of suppliers including, for example, Glowcroft Ltd. Polyoxyethylene gels, which are particularly preferred in very hostile environments such as highly saline soils, can be obtained from SmartTech Limited of Glasgow, UK, a particular PEO gel being cross-linked polyethylene oxide co-polyurethane hydrogel In the case of wetting agents, these assist in dispersing the water throughout the medium, and allow less absorbent forms of paper or other substrate to be used.

Thus, an advantage of the seed germination media of the invention is that they improve water utilisation. As such, they can be used to reduce the water requirement in situations (such as rice growing) where relatively large amounts of water may normally be required either to enable germination to take place or to suppress weed growth. Furthermore, not only can the seed germination media of the invention advantageously be used to enable growth to take place in hostile terrains, but they can also be used in more temperate conditions, for example in agriculture and horticulture, for example in growing sweetcorn, soya and salad crops.

Pesticides, (e.g. herbicides, fungicides, insecticides and nematicides etc.) can be incorporated beneath the upper layer and preferably between the layers. Although pesticide/micro-nutrient treated seed can be used, the pesticides can alternatively or additionally be incorporated into, or adsorbed or absorbed onto, the medium. This may reduce the concentration of pesticide (and fertilizer) in direct contact with the seed allowing a broader range of products to be used at higher rates without causing phytotoxicity, reducing the requirement for field applications and dose of active ingredient.

The seeds and optionally seeding agents such as propagation agents of plant, animal and fungal origin can be bonded or held by physical pressure at a predetermined density between the layers of the medium. The density of seeding will typically depend upon the required plant population and environmental or field factors, for example. The seeds can advantageously be treated with pesticides of the type referred to hereinabove.

Where the lower layer is formed from a plurality of sheets, each separate layer can be impregnated with or carry a different additive. Thus, for example, an upper sheet can carry the seeds whilst plant nutrients can be carried by an underlying sheet.

Biological agents such as bacterial spores and fungal propagation agents (eg mycorrhizae) or other propagation agents may be used to encourage plant establishment in hostile environments and/or provide a means of biodegradation of the upper and lower layers. Bacteria and soil fungi can buffer seedlings against soil contaminants (eg heavy metals) and may be incorporated to attack the upper and/or lower layers to encourage breakdown and the break through of seedlings. Typical biological agents may include any one or more of the following:

(a) vesicular arbuscular mycorrhiza fungi which will form symbiotic associations with the emerging roots and soil bacteria to encourage establishment, especially in extreme conditions (eg Mycor manufacture by Plant Health Care Inc. or Symbio Limited of Great Bookham, UK);

(b) Pseudomonas spp. which are nitrogen fixing end which will encourage seed germination;

(c) Bacillus spp. To enhance seeding and encourage the development of organic matter in the soil;

(d) Streptomycetaceas spp. or Trichoderma spp. to discourage the build-up of disease in the medium;

(e) other phosphorous solubilising and nitrogen fixing bacteria; and (f) bacteria or fungi bred or selected to lock up, solubilise or inactivate a specific range soil contaminants such as hydrocarbons, toxic substances eg cyanide and heavy metals; and (g) other microorganisms which degrade celluloses, starch and other polysaccharides.

Mixtures of bacterial plant growth activators that can be used in the seed germination media of the invention include commercially available products such as "BioPak" (manufactured by Plant Health Care Inc) and "Organica" Plant Growth Activator (manufactured by Organica Ltd).

Depending upon the materials used, bonding of the upper and lower layers can create a translaminar effect, which greatly enhances the movement of water across the medium from an irrigation source. The use of a semi-permeable layer on top reduces water loss from the absorbent layer, and super absorbents between layers reducing water demand.

The media of the invention can be provided with and/or used in conjunction with irrigation tubes. For example, one or more irrigation tubes can be sandwiched between the upper and lower layers or bonded to one or both of the exterior surfaces of the media. The irrigation tubes can be used together with solar pumps, for example, or heat sensitive mechanical pumps which control the distribution of water in accordance with the requirements of the media in a given set of environmental conditions. Irrigation tubes useful in the media of the invention can include trickle irrigation tubes which can be polymeric tubes having perforations along their length, or tubes formed by folding sheets of a polymeric material such as polyethylene and tacking the edges together to form a leaky seam through which water can escape during use.

The medium of the invention can be provided with reinforcing means for increasing its physical strength. The reinforcing means can be made sufficiently robust to enable the use of the medium as a ground anchoring medium in, for example, civil engineering applications, e.g. in the reinforcement of banks. In one embodiment, the reinforcing means can take the form of a mesh or netting made from a metal or plastics material, or can take the from of a fibrous reinforcement, such as a fibrous mat.

Where reinforcing means are present, they are preferably secured to the upper surface of the medium, for example by means of adhesive bonding. By securing the reinforcing means to the upper surface, the medium is held firmly in place. Moreover, irrigation tubes can be placed between the reinforcing means and the medium, the reinforcing means holding the irrigation tubes in place for as long as is required, for example to enable long term maintenance. A particular application of such an arrangement is in the stabilization and maintenance of steep or otherwise unstable embankments such as road and rail embankments, or mining spoil or as a covering on waste disposal landfill sites.

In another aspect, the invention provides a process for stabilising an area of ground (e.g. an embankment, such as a road or rail embankment, or mining spoilage or industrial or domestic waste dump, such as a landfill site) which comprises securing to the ground a seed germination medium as hereinbefore defined.

Either reinforced or non-reinforced medium can be used to stabilise an area of ground but, in cases such as embankments (e.g. roadside embankments) where the ground may be particularly unstable, the reinforced medium may be preferable.

In a still further aspect, the invention provides a method of growing a plant comprising placing a seed germination medium according to the invention on or beneath a soil surface (for example a soil which is saline) and allowing or causing germination of seedlings from the seeds in the medium, such that the seedlings grow through the upper layer of the medium, for example by growing through perforations formed in the upper surface or by disrupting the upper surface to form a hole(s) and growing through the hole(s).

In a further aspect, the invention provides a process for making the medium as hereinbefore defined, the process comprising the steps of:

(i) providing a first web formed from a material which will constitute the lower layer;

(ii) optionally forming a plurality of perforations in the first web;

(iii) depositing seeds onto the first web;

(iv) providing a second web formed from a material which will constitute the upper layer, (v) optionally forming a plurality of perforations in the second web, where such perforations are not already present;

(vi) optionally depositing adhesive on one or both of the first and second webs; and (vi) bonding the first and second webs together.

Moisture from adhesives applied during manufacture may initially be absorbed into the lower layer and any super absorbents present and such absorbed water may subsequently be imbibed by the seeds leading to a degree of pre-germination. As an alternative to encouraging pre-germination in this manner, seeds may be pre-treated before manufacture to pre-imbibe moisture by any one or more of a range of techniques, including fermentation and chemical treatment. The advantage of pre-germinating the seeds is that it greatly reduces the establishment time of the plant, and reduces the moisture requirement after laying, without detriment to the seed. However, where the seeds are pre-germinated, care must be taken (e.g. by seed treatment or moisture control) to avoid fungal and/or microbial attack on the seeds or physiological deterioration.

In a still further aspect, the invention provides apparatus for manufacturing a medium as hereinbefore defined, the apparatus comprising first and second support means for holding respectively the first and second webs as hereinbefore defined; a bonding station for bonding the first and second webs together (e.g. by compressing the webs together); means for advancing the first and second webs towards the bonding station; a seed dispenser upstream of the bonding station for depositing seeds onto the first web; optionally adhesive depositing means upstream of the bonding station for applying adhesive to one or both of the webs; and optionally means for perforating one or both of the first and second web prior to or after bonding to form the medium.

The bonding station can take the form of a pair of rollers, the first and second webs being conveyed through the nip between the rollers, for example after adhesive has been applied to one or both of the webs, the rollers exerting pressure on the webs to bring about bonding therebetween. The rollers preferably are relatively soft, or at least have a resilient surface, so that the seeds are not damaged as the webs pass between the rollers. Alternatively, bonding can be achieved by applying tension to the finished roll of medium. The adhesive can be deposited on the web(s) in the form of a spray (which can be for example an electrostatic spray), or by means of a roller or brushes. Preferably adhesive is deposited on the first web prior to depositing seeds on the web so as to assist in retaining the seeds on the web as it is transported towards the bonding station. Adhesive is preferably also deposited on the second web upstream of the bonding station. When bonding is to be carried out by mechanical means rather than by adhesive, such mechanical means can be provided at the bonding station.

The formation of the perforations in each web can be effected by passing the web over or through a cutter. The cutter can take the form of a pair of rollers, one having a plurality of cutting elements and the other having a plurality of complimentary recesses for receiving the cutting elements, the web being conveyed through the nip between the rollers.

In a preferred form of the invention, cutting of the webs takes place at the bonding station, the bonding station comprising a roller or rollers having laminating/compressing regions and cutting regions.

In a still further aspect, the invention provides a cutting and bonding roller for use in the apparatus of the invention, the cutting and bonding roller having one or more (preferably a plurality) axially spaced compression roller elements interspersed with one or more cutting wheels. One or more spacer elements may optionally be disposed between adjacent compression roller elements.

In one embodiment, the cutting and bonding roller comprises a drive shaft having mounted thereon a plurality of compression rollers, one or more cutter wheels being disposed between at least one pair of adjacent compression rollers; and a plurality of spacer elements, the spacer elements being interposed between adjacent cutter wheels so as to space the cutter wheels apart. The drive shaft can have one or more slots or protrusions or other keying means which cooperate with complimentary formations on the cutter wheels and optionally the spacers so as to hold at least the cutter wheels against relative rotation with respect to the drive shaft.

The cutter wheels have a plurality of cutting edges spaced (preferably regularly) around their circumference. The cutting edges can be saw toothed or arcuate in form, for example, and can be arranged in either a continuous or discontinuous array. For example, in a discontinuous array, the cutter wheel can have a plurality of cutting edges separated by non-cutting edges of a smaller radius than the cutting edges, the cutting and non-cutting edges having substantially concentric radii. In a continuous array, the cutting edges can have, for example, a substantially sinusoidal form.

In another aspect, the invention provides an adhesive composition suitable for use in the matrices as hereinbefore defined, the adhesive comprising a water soluble or water dispersible adhesive polymer such as PVA; and one or more (preferably two or more) agents selected from pesticides (for example herbicides, fungicides, insecticides, nematicides), plant micronutrients (such as zinc, copper, boron), organic and inorganic fertilisers, plant growth regulators (e.g. seaweed extract), plant growth promoters and hormones, buffering agents and pH regulators (e.g. lime and sulphur), and salt binding agents such as gypsum (calcium sulphate).

BRIEF DESCRIPTION OF THE DRAWINGS

The invention will now be illustrated, but not limited by reference to the particular embodiments shown in the accompanying drawings of which:

FIG. 5b illustrates schematically the arrangement of seed and additive guiding baffles and their spatial relationship with the cutter roller of FIG. 5a;

DETAILED DESCRIPTION OF THE PREFERRED EMBODIMENTS

Figure 1:
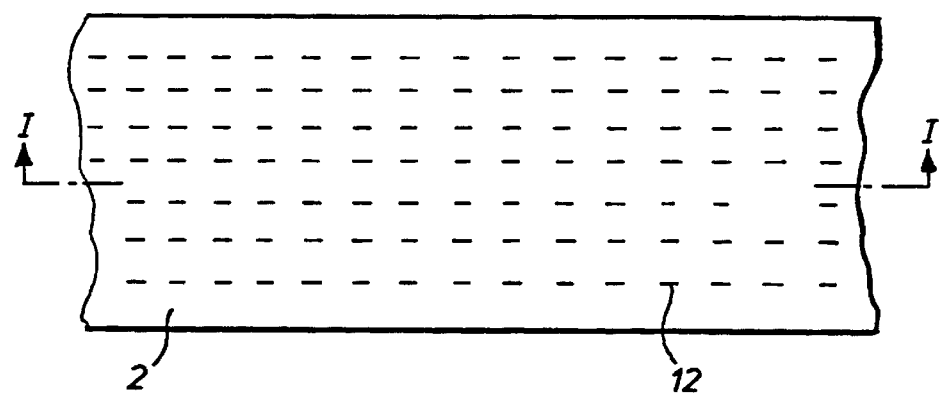
FIG. 1 is a view from one side of a length of medium according to one embodiment of the invention.
Figure 2:
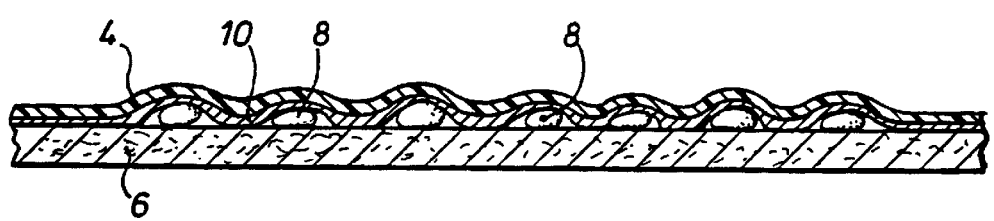
FIG. 2 is a sectional elevation along line I—I in FIG. 1.
Figure 3:
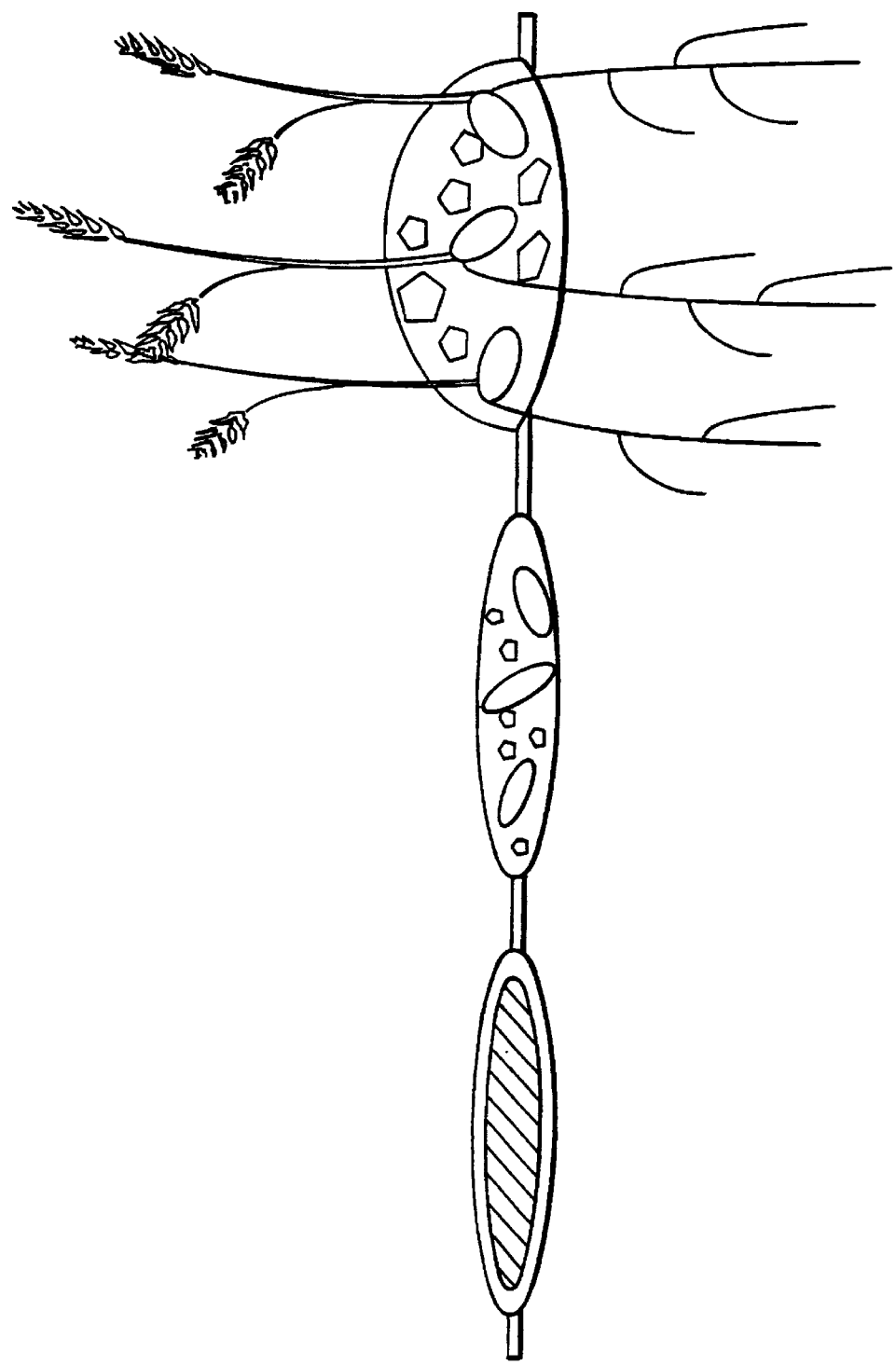
FIG. 3 is a schematic partial cross sectional view illustrating the use of the medium.

Referring now to FIGS. 1 and 2, a medium 2 according to one embodiment of the invention comprises an upper layer 4 and a lower layer 6. Upper layer 4 is formed from a lightweight tissue paper which in this embodiment is a 22 grammes per square meter grade of sulphite paper (available from Kruger Tissue Group), which is permeable to gases, and partially permeable to water vapour. The surface of the tissue paper layer is treated with a coating of a wax during the manufacture of the germination medium in order to render it impermeable to water in liquid form. Lower layer 6 is formed from a 38–150 gm/m$^2$ grade of air-laid paper such as the 38 g air-laid paper available from Walkisoft GMBH, Steinfurt, Germany.

Disposed between the upper and lower layers 4,6 are seeds 8 which may optionally be coated (e.g. with one or more pesticides). Other desirable agents can also be disposed between the layers, examples being super-absorbent substances for increasing the water carrying/retaining capacity of the medium (such as "SwellGel"—available from Glowcroft Ltd, Gloucester, UK.), buffering agents, and beneficial bacteria and fungi as described above.

The upper and lower layers 4,6 are bonded together by means of an adhesive layer 10 which, in this embodiment, comprises PVA. The PVA can contain one or more agents such as pesticides (for example herbicides, fungicides, insecticides, nematicides), plant micronutrients (such as zinc, copper, boron), organic and inorganic fertilisers, plant growth regulators (e.g. seaweed extract), plant growth promoters and hormones, buffering agents and pH regulators (e.g. lime and sulphur), and salt binding agents such as gypsum (calcium sulphate) and microbial species beneficial to plant growth and development and/or which degrade cellulose or other polysaccharides so as to bring about controlled biodegradation of the two paper layers. The adhesive can be applied in such a manner, and in such an amount, as to soak into the upper layer 4 thereby providing the upper layer with at least temporary waterproofing properties. In the event that the adhesive per se does not provide the desired waterproofing properties, waterproofing additives such as beetle resin can be included in the adhesive. In the event that waterproofing is provided by the adhesive permeating into the upper layer, the waterproof coating referred to above may be omitted.

Both the upper and lower layers 4,6 are perforated by an array of slits, the slits in the upper layer 4 being denoted by the number 12 in FIG. 1, and the slits in the lower layer 6 not being shown. The slits in the upper and lower layers 4,6 are not in register and therefore the medium cannot be opened out into a lattice form in the manner of the medium shown in WO 96/28010. The slits provide lines of weakness in the layers which enable the layers to be disrupted by the emerging seedlings so that the seedlings can grow through. The slits in the lower layer 6 can be omitted if desired.

Figure 4:
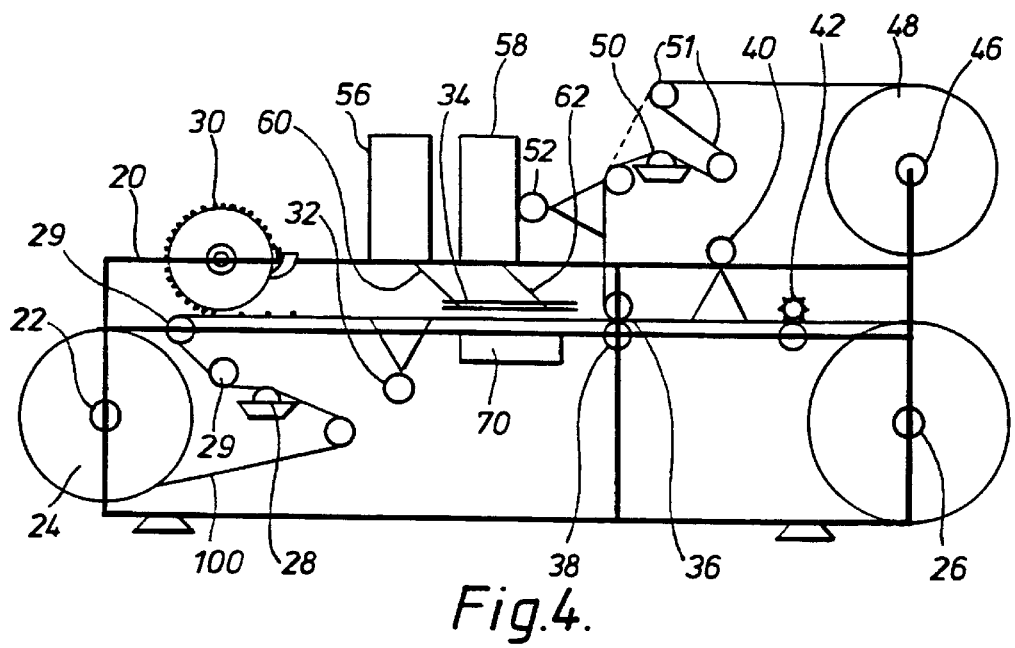
FIG. 4 is a schematic side elevation of an apparatus for manufacturing a medium of the type shown in FIGS. 1 and 2.

An apparatus for manufacturing the medium of FIGS. 1 and 2 is shown in FIGS. 4 and 5. Thus the apparatus comprises a frame 20 to which are rotatably secured a spindle 22, upon which is mounted a roll 24 of the air-laid paper which will constitute the lower layer 6; and a spindle and roll core 26, upon which the finished medium is collected. Located between the spindles 22 and 26, in sequence, are an adhesive applicator roller 28, guide rollers 29, a drum seeder station 30, a first waterproofing spray station 32, baffles 34, a bonding station 36 comprising a pair of laminating rollers 38, a second waterproofing spray station 40, and optionally a pair of cutter rollers 42 (which can be omitted if perforations are not required on the lower layer, or if the laminating rollers at the bonding station at provided with cutters). A seed dispensing hopper 56 and granule applicator 58 are mounted above the first web immediately upstream of the bonding station, and are connected to the baffles 34 by means of chutes 60 and 62 respectively. Seed dispensing hopper 56 may be used as an alternative to the drum seeder station 30, or as an additional means of introducing seeds into the medium.

Mounted above the product collecting spindle 26 is a spindle 46 upon which is mounted a roll 48 of the lightweight paper tissue which will constitute the upper layer 4. Disposed between the spindle 46 and the laminating rollers at the bonding station is an adhesive applicator roller 50, guide rollers 51 and adhesive spray head 52 connected to a supply of aqueous adhesive (not shown).

In use, a web 100 of the air-laid paper is pulled through the machine by means of a powered drive shaft on the product collecting spindle 26. The web 100 is drawn along past the adhesive applicator roller 28, such that a thin film of adhesive is applied to the web and then passes under the seed drum 30 where seeds are deposited onto the web 100 from the drum. The web then moves along beneath the baffles 34 where granules of a composition containing superabsorbent polymer, other desired additives such as buffers, and beneficial microbial species are dispensed from granule applicator 58. At this point, as an alternative (or addition) to using the drum seeder 30, the seed dispensing hopper 56 may be used to deposit seeds onto the web. The baffles 34 serve to guide the granules and seeds into longitudinal parallel rows.

Figure 5A:
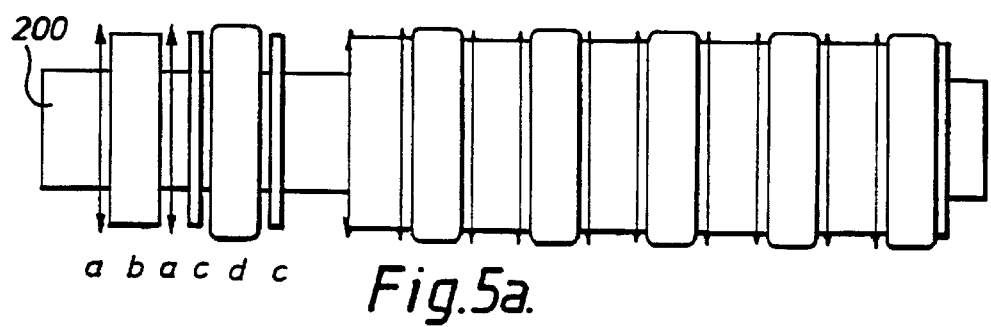
FIG. 5a is a side view of a cutter roller of the type used in the apparatus of FIG. 4.

At the bonding station 36, the web 102 forming the upper layer of the medium converges with the web 100, which has previously been coated with an adhesive by means of the adhesive roller applicators and the adhesive spray applicator. The two webs 100 and 102 are drawn between the rollers 38 and compressed to bond them together. If plain rollers are used at the bonding station 36, the two webs will be bonded together across their entire width. However, it is preferred that a roller of the type shown in FIG. 5a is used in which case compression and bonding takes place in lines spaced across the width of the webs. By configuring the rollers 38, baffles 34 correctly, the seeds and other materials can be introduced onto the web in rows such that compression and lamination takes place either side of each row. This prevents any damage to the seeds as a result of the action of the rollers, and also ensures that a more secure bond is formed between the two webs at the locations where there are no seeds or other materials. The roller shown in FIG. 5a cuts slits into the medium at the same time as laminating the two webs together, and thereby removes the need for a separate cutting or slitting station 40. However, as an alternative to using the roller shown in FIG. 5a, a roller having no cutting edges may be used, and a separate cutting station 40 provided. After the bonding stage and subsequent winding, some water from the adhesive may still remain in the paper, held by the more absorbent lower web 100. Allowing the web to retain some water can lead to partial germination of the seed or initiation of the germination step. This can be advantageous in certain circumstances and, for example, can help to bring about more rapid establishment of the plant when the medium is put to use. However, if desired, in order to reduce the water content of the glue, the webs may optionally be conveyed through an oven, drier or air-knife prior to winding onto the roll. Removal of the water prior to storage assists in maintaining a prolonged shelf life for the medium.

The above process is preferably controlled by means of a central processing unit 70 linked to the various motors used to drive the spindles, compression rollers and seed, adhesive and additive dispensing means thereby ensuring greater consistency in the end product.

The size of the rolls of seed germination medium formed according to the foregoing process will depend upon the raw materials, the intended method of laying (by agricultural machinery or by hand), and the area intended to be covered. However, purely by way of example, the rolls can be up to 1.2 meters wide, 4200 meters in length, and may cover up to about 0.5 hectares or more.

It will be appreciated that various modifications can be made to the process described above. For example, in the process described above, the upper and optionally the lower webs are slit by cutter rollers. However, instead of cutting the slits during the process, one or both of the webs can be pre-cut. In certain instances, the lower layer 6 of the medium need not be cut at all, the rooting strength of the germinating seedling being sufficient to force a way through the lower surface of the medium.

Also, the Figures illustrate the germination medium being manufactured with the lower layer 6 of the medium being formed by the lower web 100, and the upper layer 4 by the upper web 102. However, the apparatus illustrated, and in particular the positioning of the adhesive rollers and sprays, and the waterproofing spray heads, is sufficiently versatile that it could equally be set up in the reverse configuration should the need arise.

In order to effect accurate placement of the seeds, the seeds can applied using the drum seeder 30. However, as an alternative, the seed hopper/plate seeder 56 or a similar device could be used to broadcast seed on to the web. Other biological agents such as bacterial spores may be added in the same way. As indicated above, the seeds can be laid into rows using the baffles as guides, but they need not be, but instead could be spread evenly over the entire surface of the web.

A typical laminating and cutting roller used in the apparatus of the invention is shown in FIG. 5a Each cutter roller comprises a central spindle or drive shaft 200 on which is mounted an array of compression rollers (d), narrow spacers (c) cutter wheels (a) and wide spacers (b). The compression rollers, cutter wheels and spacers are held against rotation on the spindle by means of key slots (not shown) which engage a spline (not shown) on the spindle. As can be seen from the Figure, each pair of adjacent compression rollers (d) has a pair of cutter wheels (a) arranged therebetween, the cutter wheels (a) being spaced from each other by means of a large spacer (b) and from the compression rollers (d) by means of narrow spacers (c).

Figure 5B:
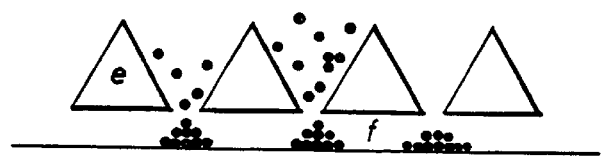

In FIG. 5b, the alignment of the baffles with regard to the various elements of the bonding rollers is shown. Thus, the gaps between the baffles are aligned with the wide spacers (b) such that seeds and other materials are deposited onto the web between the regions of the webs that are subjected to compression by the compression rollers (d). By positioning the cutter wheels (a) such that they are at the edges of the unbonded regions of the medium, lines of weakness are formed that enable the developing seedlings more easily to rupture and grow through the upper layer.

Figure 6:
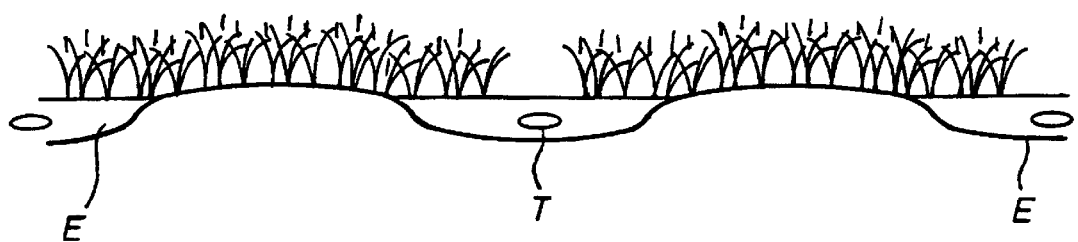
FIG. 6 is a schematic end view illustrating the medium of the invention installed in a soil substrate.
Figure 7:
FIG. 7 is a schematic end view illustrating an alternative layout in a soil substrate.

The seed germination medium of the invention can be laid using existing agricultural or horticultural equipment, for example the machinery typically used for laying polyethylene sheeting, or crop mulching equipment In general, the soil or ground can be prepared in advance of the laying to produce a relatively smooth clod free bed. Furrows F are then opened up on either side of the medium and the medium is partially buried as shown in FIG. 6 and 7. Burying the edges E of the medium helps to hold it in place against the action of, for example, winds. Trickle irrigation tubes T (for example of the "Drip Tape" type—available from Wright Rain Limited, Ringwood, UK) can be incorporated at laying or the medium may be wetted utilizing overhead, ditch or flood irrigation. As much of the medium as possible should be covered to assist establishment and reduce water consumption although the medium can be laid on the surface if necessary and an appropriate securing system used. Once wetted, the medium will retain moisture to allow the seeds to germinate. Ideally little or no further moisture should be applied to encourage rapid deep rooting and self sustainability. However, this may not be practical in all situations and additional water may be required. As an alternative to trickle irrigation, a form of flood irrigation could be used by laying the medium into a depression in the ground, which may formed manually or by the equipment used to lay the medium, and allowing or causing water to run over the surface of the upper layer.

The advantage of the medium of the present invention is that it provides a protected local environment which is favourable to the germination of seeds and the subsequent development of seedlings. The medium has a substantially reduced water demand compared to conventional overhead and trickle irrigation systems, and can be applied to land using existing plastic/mulch laying equipment. A further benefit of the medium is its compatibility with existing trickle, overhead, trench and flood irrigation systems. Once the medium has been laid, there is a minimal requirement for additional irrigation. If desired, however, a trickle irrigation system can be incorporated into the medium at manufacture. Further substantial advantages are the ease of manufacture of the medium and its long shelf life. Moreover, the medium can be used in both hostile and normal agricultural situations.

EXAMPLE

The following examples illustrate the properties of various seed germination media prepared in the manner described above.

Example 1

Effect on Seedling Growth of Various Additives

A number of samples were made up using 50 gsm (grammes per square meter weight) air-laid paper for the lower layer and sulphited tissue paper as the upper layer. The materials were cut to 10 cm$^2$ squares before applying seeds and various additives and then laminating. A starch-based adhesive incorporating a waterproofing agent (obtained from National Starch NS Ref. 0720185) was used to laminate the two layers together. Various additives were placed in two discrete rows 2 cm wide with a 1 cm gap between rows and at the edges on to the lower absorbent layer. Adhesive was applied to the upper layer which was then laminated to the lower layer using a profiled roller of the type shown in FIG. 5a. Samples were labelled and placed into 10 cm$^2$ petri dishes over a fixed quantity of vermiculite with 10 ml of water. Samples were left under glass. Seedling germination, vigour and penetration of the upper lager were observed and recorded. The quantities of additives incorporated into the various samples are shown in Table 1 below, and the effects of the additives on seedling growth are shown in Table 2.

TABLE 1

| Samples and Application Rates (gsm) | | Application Rates (gsm) | | | |
| --- | --- | --- | --- | --- | --- |
| | Fertiliser Rate (gsm) | 0 | 10 | 20 | 30 |
| F0 | Fertiliser (F) @ 0, | 0 | 0.1 | 0.2 | 0.3 |
| F10 | 10, 20, 30 gsm | | | | |
| F20 | | | | | |
| F30 | | | | | |

TABLE 1-continued

| Samples and Application Rates (gsm) | | Application Rates (gsm) | | | |
| --- | --- | --- | --- | --- | --- |
| | Fertiliser Rate (gsm) | 0 | 10 | 20 | 30 |
| P5, F0 | F + Plant growth | 0.05 | 0.15 | 0.25 | 0.35 |
| P5, F10 | stimulator (PGS) @ | | | | |
| P5, F20 | 5 gsm | | | | |
| P5, F30 | | | | | |
| L100, F0 | F + lime (L) @ | 1.0 | 1.1 | 1.2 | 1.3 |
| L100, F10 | 100 gsm | | | | |
| L100, F20 | | | | | |
| L100, F30 | | | | | |
| G30, F0 | F + polyacrylamide | 0.3 | 0.4 | 0.5 | 0.6 |
| G30, F10 | gel (PAG) @ 30 gsm | | | | |
| G30, F20 | | | | | |
| G30, F30 | | | | | |
| P5, G30, F0 | F + PGS + PAG | 0.35 | | 0.75 | |
| P5, G30, F20 | | | | | |
| P5, G30, L100, F0 | F + PGS + PAG + L | 1.35 | | 2.15 | |
| P5, G30, L100, F20 | | | | | |
| P5, G15, f20, L100 | F + PGS + PAG + L | | | 1.35 | |
| P5, G15, F20, L0 | F + PGS + PAG | | | 0.4 | |

Key
F = Fertiliser (14:10:27 with some trace elements)
P = Plant growth stimulants - proprietary brand manufactured by Organica Ltd
L = Lime
G = Super-absorbent gel (polyacrylamide)

TABLE 2

| Sample | Vigour 0 = dead, 5 = strong | Notes |
| --- | --- | --- |
| F0 | 2 | Germination and penetration OK but weaker than others after 2 weeks. |
| F10 | 3 | Good growth and establishment. |
| F20 | 4 | Good growth and establishment. |
| F30 | 5 | Very strong. |
| P5, F0 | 4 | Quick to establish. Upper and lower layer destroyed by bacteria on all samples. |
| P5, F10 | 4 | Slow to establish. Some evidence of anaerobic conditions. |
| P5, F20 | 2 | Slow to establish. |
| P5, F30 | 1 | Poor - probably kept too wet so bacteria took hold: rate too high? |
| L100, F0 | 3 | Weak but OK. |
| L100, F10 | 3 | Weak but OK. |
| L100, F20 | 3 | Weak but OK. |
| L100, F30 | 5 | Very strong. |
| G30, F0 | 5 | Very strong and lifting upper layer throughout batches. Rate too high. |
| G30, F10 | 5 | |
| G30, F20 | 5 | |
| G30, F30 | 5 | |
| P5, G30, F0 | 5 | Very strong. Lifting upper layer. |
| P5, G30, F20 | 5 | |
| P5, G30, L100, F0 | 5 | Very strong. Lifting upper layer. |
| P5, G30, L100, F20 | 5 | |
| P5, G15, f20, L100 | 5 | Very strong. Lifting upper layer. |
| P5, G15, F20, L0 | 5 | |

Conclusions

The data demonstrate that:

(a) the bacteria present in the plant growth stimulator have a beneficial effect on the establishment of the seedlings and that, moreover, they cause beneficial rotting of the upper and lower layers. However, damage to the seedlings can result if the conditions are kept too wet. The concentration (rate) of application of the PGS is probably too high and preferably should be lowered to about 1 gsm;

(b) lime was found to have no negative or positive interaction with other materials in the trial;

(c) fertiliser was found not to suppress growth at up to 30 gsm, and therefore higher rates could be tried;

(d) too much polyacrylamide gel separates the layers and allows seedlings to establish between the layers rather than encouraging seedling penetration. Therefore, the concentration of PAG should be reduced.

On the basis of the test data obtained to date, one preferred composition for use in the seed germination media of the invention is as follows:

| | |
|---|---|
| Polyacrylamide | 10 gsm |
| Fertiliser | 20 gsm |
| Bacteria (plant growth stimulator) | 1 gsm |
| Lime | 54 gsm |
| Fine grade vermiculite | 5 gsm |

The purpose of the fine grade vermiculite is to improve aeration and reduce the risk of anaerobic conditions developing in the medium.

Example 2

Germination of Grass Species in Saline Soils

Experiments were conducted in order to evaluate a seed germination matrix of the invention as a means of promoting the germination, subsequent emergence and growth of eight grass species in saline soils. A saline soil is that which has an electrical conductivity of greater than 4 dS/m. Experiments were also carried out to evaluate the interaction of various microbiological additives with the grass species.

Materials and Methods

Preparation of the Saline Growing Substrates

The following salts (calcium chloride, magnesium chloride and sodium chloride) were applied to a sterilised growing substrate (John Innes Seed Compost) at rates which were sufficient to increase the electrical conductivity to 12 dS/m (medium salinity) and 22 dS/m (high salinity) following the method of Rowell (Soil Science, Methods and Applications, Publ. Longman Scientific & Technical, 1994). The untreated substrate was used as the control and had an electrical conductivity of 2.5 dS/m. The measurement of electrical conductivity was performed as follows: 20 grammes of soil and 100 ml of substrate were shaken for one hour after which the suspensions were allowed to settle and the electrical conductivity of the supernatants was measured using either a DiST 3, or DiST 4 handheld conductivity meter. These values were converted to those representative of the saturated extract, following the method of Rowell (1994). The substrates and salts (where required) were mixed together using a compost mixer to ensure an even distribution of salts throughout the substrate.

Selection of Grass Species.

Following consultation with established seed merchants (Pope and Chapman, Bishops Stortford, UK) and the technical literature, eight grass species, of varying tolerances to salinity, were selected. These included amenity and agricultural cultivars and are listed in Table 3. Germination tests, using a standard technique, were conducted at 25 degrees Celsius and these showed that at least 85% of each seed species germinated within 14 days from the start of the test.

TABLE 3

Grass species listed in order of tolerance to saline conditions

| Species | Cultivar | Seed rate (g/sq. m) |
|---|---|---|
| Saltmarsh Grass *Pucinella distans* | Salty | 40 |
| Slender Red Fescue *Festuca rubra litoralis* | Smirna | 40 |
| Dwarf Tall Fescue *Festuca arundinaceae* | Cochise | 30 |
| Creeping Bent *Agrostis stolonifera* | Kromi | 10 |
| Fine Perennial Ryegrass (PRg) *Lolium perenne* | Numan | 25 |
| Strong Creeping Red Fescue *Festuca rubra rubra* | Pernille | 40 |
| Tetraploid Agricultural. PRg *Lolium perenne* | Calibra | 30 |
| Smooth Stalk Meadow Grass *Poa pratensis* | Conni | 20 |

Microbiological Additives

A range of soil bacterial and fungal inoculants were incorporated into the matrix for evaluation. A proprietary mix of inoculants (Symbio Ltd, Great Bookham, UK) was selected for the trial. The mix included vesicular-arbuscular mycorrhizae, pseudomonas, and bacillus species and a range of other phosphorous solubilising and nitrogen fixing bacteria with biostimulants. In this example, for simplicity, the fungi, bacteria and additives used are generally referred to as 'bugs'.

Manufacture of the Matrix

Samples (0.15 sq.m) were made by hand from a super-absorbent air-laid paper (Walkisoft) forming a lower layer and perforated sulphite paper (Kruger Tissue, Church Stretton, Shropshire, UK) forming the upper layer. An aluminium frame was used to subdivide the lower layer into 16 strips, each 30 cm in length, and 2 rows were allocated to each cultivar. Seeds, fertilisers (Westland Specialist Feed-All), polyacrylamide gel ("Swell Gel"—Glowcroft Limited)) were applied to all treatments and the microbiological additives were applied at the equivalent field rate to half of the treatments. The application rates were as follows: fertiliser (20 g/sq.m), polyacrylamide gel (30 g/sq.m) and the microbiological additives at 50 g/sq.m.

A PVA adhesive (Mystolene, Colomance PLC, Welwyn Garden City, UK) was applied to the upper layer which was then bonded to the lower layer using a laminating process which bound the layers and encapsulated the seed and additives. A wax emulsion was sprayed onto the exposed surface of the upper layer to provide waterproofing.

Preparation of the Containers and Laving of the Matrix

"Sankey" trays (0.58 m*0.38 m) were used to contain each treatment Horticultural grade coarse grit (nominal size 4mm) was poured into the base of each tray (3.5 liters per tray), after which 2 liters of mains water was added. The gravel served two purposes: firstly, to prevent the substrate slumping into the base of the trays and, secondly, to act as a reservoir. The substrate (8 liters) was then placed over the water-filled gravel, the matrix was laid over the substrate, and half of the matrix was buried.

Trays were also directly sown without the matrix, using the same cultivars to assess the benefits of the matrix. In this case only the seeds were applied. The quantities of gravel, water and substrate were the same as described above.

Treatments and Trial Design

The treatments are summarised in Table 4. There were three trays for each treatment and one for each control. All the trays were placed in a heated and lit greenhouse. The average daily temperature was 20° C. and the lights were on for a period of 12 hours each day (08:00–20:00).providing a light intensity of 61 micro mols/sq.m/second.

TABLE 4

Summary of treatments

|  | Low salinity (2.5 dS/m) | Medium Salinity (8 dS/m) | High salinity (13 dS/m) |
|---|---|---|---|
| Treatments | + bugs<br>− bugs | + bugs<br>− bugs | + bugs<br>− bugs |
| Control | seed only | seed only | seed only |

Additional water was applied after 14 days and, for the remainder of the trial, in response to use. The water content of the trays was maintained below field capacity (where the substrate would slump leading to physiological stress).

Sampling

After 28 days the grasses were harvested from the buried side. A grid (0.0015 sq.m) was placed over both ends of the rows and the grass enclosed therein was cut at the soil surface/matrix surface. The grass samples were placed in pre-weighed paper bags and together were dried at 80° C. for 24 hours after which they were weighed again to determine the dry matter percentage of each sample. In addition, the numbers of plants and leaves were determined for one of the species, the tetraploid agricultural perennial ryegrass (c.v. Calibra). The mean dry matter production per square meter of the various cultivars are summarised in Table 5 below.

TABLE 5

| Mean dry matter (g per sq.m) | Control Low | Matrix Low No Bugs | Matrix Low Bugs | Control Medium | Matrix Medium No Bugs | Matrix Medium Bugs | Control High | Matrix High No Bugs | Matrix High Bugs |
|---|---|---|---|---|---|---|---|---|---|
| Salty | 47 | 44 | 64 | 10 | 38 | 17 | 0 | 7 | 34 |
| Smirna | 52 | 89 | 75 | 0 | 46 | 30 | 0 | 4 | 3 |
| Cochise | 82 | 144 | 96 | 0 | 78 | 74 | 0 | 25 | 37 |
| Kromi | 70 | 52 | 33 | 0 | 55 | 32 | 0 | 0 | 0 |
| Newman | 73 | 178 | 172 | 31 | 111 | 96 | 0 | 11 | 37 |
| Pernille | 45 | 54 | 70 | 0 | 45 | 60 | 0 | 0 | 9 |
| Calibra | 66 | 241 | 211 | 26 | 108 | 139 | 0 | 25 | 25 |
| Conni | 20 | 35 | 48 | 0 | 17 | 12 | 0 | 0 | 0 |

Observations

All of the varieties tested responded well in medium salinity soil and four responded well in high salinity soil. Thus, after 7 days the Numan and Calibra varieties had emerged from the low and medium salinity treatments. The emerged seedlings came from that part of the matrix which was buried. In the low salinity control tray Numan, Calibra, Kromi and Pernille had emerged and in the medium salinity tray only Numan had emerged.

After 14 days all of the cultivars had emerged from the low and medium salinity treatments and the corresponding controls. Emergence was much reduced and slower from the high salinity treatments and the corresponding control tray. During this time, salt deposits were observed on the soil and matrix surfaces in the medium and high salinity treatments including control plots.

Subsequently there was only limited germination and emergence from the matrix that was uncovered and had been laid on the surface of the substrate, especially where there was poor contact between the uncovered matrix and the underlying substrate. Consequently, no comparative data were taken from this area.

After harvest the matrix was removed from each tray. It was clear that not only had germination failed where the matrix was not buried but that substantial quantities of salt had been deposited between the matrix and the substrate surface, in addition to the salts which were deposited on the uncovered matrix surface.

It seems likely that the salt deposition problem was caused by a "wicking" action whereby water containing salts is drawn up through the matrix by the superabsorbent polyacrylamide gel as the upper surface of the matrix dries out in air. This phenomenon did not give rise to any appreciable problems with germination when the matrix was buried. A further advantage of burying the matrix was that those parts of the matrix that were buried in the low and medium salinity treatments had mostly decomposed after 28 days.

Four cultivars demonstrated considerable potential for subsequent trials: Cochise and Pernille (fescue spp.) and Numan and Calibra (ryegrass spp.). However, Pernille was situated between the two aggressive ryegrass cultivars which may have out competed the fescue. The mean dry matter productions per square meter of the following cultivars; Cochise, Newman, Pernille and Calibra, are summarised in Table 6.

TABLE 6

Dry matter production per square meter.

|  | Cochise | Numan | Pernille | Calibra |
|---|---|---|---|---|
| Low Salinity |  |  |  |  |
| Control | 82 | 73 | 45 | 66 |
| Matrix + bugs | 96 | 172 | 70 | 211 |
| Matrix − bugs | 144 | 178 | 54 | 241 |
| Medium Salinity |  |  |  |  |
| Control | 0 | 31 | 0 | 26 |
| Matrix + bugs | 74 | 96 | 60 | 139 |
| Matrix − bugs | 78 | 111 | 45 | 108 |
| High Salinity |  |  |  |  |
| Control | 0 | 0 | 0 | 0 |
| Matrix + bugs | 37 | 37 | 9 | 25 |
| Matrix − bugs | 25 | 11 | 0 | 25 |

The greatest increase was observed within the low salinity treatments where the matrix gave a clear advantage over the direct sown treatment. There was an apparent reduction in yield where the "bugs" were applied to the matrix. The medium treatments followed a similar pattern; The largest yield difference occurring between the matrix treatments and the control. In contrast to the low treatments, Calibra produced larger yield of dry matter when "bugs" were incorporated into the matrix. Pernille produced larger yields of dry matter In both low and medium levels of salinity in response to the +"bugs" treatments. Both Cochise and Numan apparently provided larger yields where no "bugs" were incorporated within the matrix.

Data from the high salinity treatments showed that plant growth was suppressed where the seeds were sown directly into the saline soil. Both Cochise and Numan produced larger yields of dry matter from the +"bugs" treatment, whereas the yields of Calibra were the same in both treatments.

The results of the experiments demonstrated that the matrices of the invention promote the establishment and growth of seedlings in saline conditions where otherwise grass species will not grow. The microbiological additives provided apparent benefits with some grass species but not with others. Complete burial of the matrix ensured even germination and emergence in saline conditions but the results showed that alternative absorbents of buffering agents are required for surface use on saline soils, since the polyacrylamide gels concentrate salts at the surface in highly saline soils.

Example 3

Experiments Illustrating the use of Germination Matrices Containing PEO Buffering Agents in Saline Soils Further experiments were carried out to test the effectiveness of the matrices of the invention in enhancing the establishment of grass and clover in saline and hostile environments. The tests were carried out in NSW, Australia. In particular, the experiments were designed to determine the most appropriate buffering materials, absorbents and microbiological agents for use in saline soils.

Soil salinity is a major and increasing limitation to agricultural production. It is caused by the accumulation of salts in the rooting zone. At higher levels (above 6 dS/m) the presence of salt affects many crops and prevents all but tolerant species from being established. One way to overcome this problem is to leach the salts out of the soil profile. Continual irrigation will prevent salts being drawn back to the surface but if insufficient water is applied salinity will increase as salts are drawn up to the surface. Without effective management these soils may be lost from agricultural production thereby beginning the process of desertification.

High levels of salinity in the rooting zone inhibit plant establishment in three ways:

1. Physiological drought caused by a reduction in the availability of water to plants by lowering the osmotic potential, despite the apparent availability of water.
2. Toxicity effects of sodium and chloride and ionic imbalance in the plant
3. Structural deterioration leading to capping of the topsoil.

Plant growth at the saline trial site was impaired by a combination of these factors.

The matrix of the invention incorporates various buffers and absorbents to allow plants to be established in hostile conditions with minimum water requirement. Microbiological additives (bacteria and mycorrhizae) may also be included in the seed mat. Plant growth is enhanced in certain environments where plant roots have been inoculated with these organisms and inoculation is more successful where seeds, bacteria and mycorrhizae are placed together in a protective environment In this series of experiments, field plots were established at Freemans Reach, near Hawkesbury, NSW, Australia. The plots were selected on the basis that they had saline soils that were a major problem to the farmer. The majority of soils at Freemans Reach are clay loams overlying clay that is mottled, a characteristic of poorly drained soils. The topsoil has a weak structure that sets hard when dry. The soils have a background salinity of at least 8 dS/m. Soil salinity has developed through effluent seepage from a nearby intensive livestock units and from groundwater which is inherently saline. The former has also led to excessive levels of phosphorous in the soils within the catchment and consequently an antagonistic reaction to some of the soil bacteria was expected.

The effect of soil salinity on the growth of indigenous grass and clover species was investigated using the seed germination mats of the invention and (for comparison and control purposes) direct sown plots. The experiments were undertaken in two distinct stages. In the first stage, seed mats were produced that contained a variety of species (Table 7) with a range of buffering and bacterial inoculants in various combinations (Tables 8 & 9). These were laid and subjective observations were made to determine the most appropriate range of additives. The results were subsequently incorporated into larger 10 meter plots. Results from the more extensive study were quantitatively assessed using dry matter production and these are presented below (Table 10).

Materials and Methods

Seven grasses and one clover cultivar (Table 1) were selected as indicator species, as follows:

TABLE 7

Grass and clover species

| Species | Application rate (kg/ha) |
| --- | --- |
| Tall wheat grass (*Agropyron elongatum*) | 200 |
| Creeping red fescue (*Festuca rubra*) | 200 |
| Finelawn petite dwarf fescue (*Festuca arundinacea*) | 200 |
| Gator ryegrass (*Lolium perenne*) | 200 |
| Tetila ryegrass (*Lolium perenne*) | 25 |
| Kentucky bluegrass (*Poa pretensis*) | 50 |
| Palestine strawberry clover (*Trifolium fragiferum*) | 5 |
| Penncross hybrid bent (*Agrostis stolonifera*) | 100 |

Species were individually segregated in the first observation and subsequently mixed for the larger plots.

A range of additives including buffering agents, water absorbents (synthetic products and clay minerals) and bacterial inoculants were included in the initial assessments (Table 8,9).

TABLE 8

Additives

| Additive | Application rate (kg/ha) |
| --- | --- |
| Calcium bentonite (clay mineral from the montmorillonite group) | 25 g/m$^2$ |
| Zeolite (clay mineral from the montmorillonite group) | 15 g/m$^2$ |

TABLE 8-continued

Additives

| Additive | Application rate (kg/ha) |
|---|---|
| Polyacrylamide (Pa) (marketed as 'Swellgel Rootdip') | 25 g/m$^2$ |
| PEO Hydrogel* | 50 g/m$^2$ |
| A-100 (bacterial inoculant supplied by Ambello Pty | 15 g/m$^2$ |

*A buffer/absorbent found from polyoxyethylene and available from Smart-Tec Ltd, Edinburgh, UK)

In the initial plot work, grasses and clover species were kept separate and each species was laid in two adjacent rows, 30 cm apart, onto air-laid paper. Additives were applied evenly over the seeded area, with the exception of A-100, a bacterial inoculant, that was applied at logarithmic scale in order to assess its effect on seed germination and to determine a suitable rate of application. Perforated and calendered tissue paper was then attached, using PVA adhesive, and laminated to produce a seed mat.

Before laying, the sites were surveyed to determine the level of salinity by measuring the electrical conductivity (ECe). Salinity was typically 8 dS/m with one small area at 3.2 dS/m. The area with low salinity was at the top of the gentle slope where increased leaching of the salts was possible. Consequently this was included in the study as a control area. A lower lying area was selected for undertaking the bulk of the trials where higher levels were consistent.

TABLE 9

Treatments and combinations of additives.

| Treatment | Seed | Seed mat | A-100 (Bacteria) | Pa | PEO Hydrogel | Calcium-Bentonite | Zeolite |
|---|---|---|---|---|---|---|---|
| A | ✓ | | | | | | |
| B | ✓ | ✓ | | | | | |
| C | ✓ | ✓ | ✓ | | | | |
| E | ✓ | ✓ | | | ✓ | | |
| F | ✓ | ✓ | | | ✓ | | ✓ |
| G | ✓ | ✓ | | | | ✓ | |
| H | ✓ | ✓ | | | ✓ | ✓ | ✓ |
| I | ✓ | ✓ | | | | ✓ | ✓ |
| J | ✓ | ✓ | ✓ | ✓ | ✓ | | |
| L | ✓ | ✓ | ✓ | | ✓ | | |
| N | ✓ | ✓ | ✓ | | | ✓ | ✓ |
| P | ✓ | ✓ | | | ✓ | ✓ | ✓ |
| ✓ | ✓ | ✓ | | ✓ | | ✓ | ✓ |
| R | ✓ | ✓ | ✓ | | ✓ | ✓ | ✓ |
| S | ✓ | ✓ | ✓ | ✓ | | ✓ | ✓ |

The pre-prepared sample rolls were laid onto the top of raised beds on Mar. 9, 2000 with direct seeded controls in the high and low saline areas of the site. The top of the bed was levelled and soil was moved to the outer edge. The mats were laid on the levelled surface and soil was drawn onto the mat to provide a covering of between 10 and 20 mm. The control treatments were direct sown on the beds at the end of the seed mat treatments. Seeds were sown into rows; these were then covered with the same depth of soil to mimic the treatment plots as closely as possible. Irrigation of the plots was unnecessary as the area suffered from unprecedented levels of rainfall following laying. This resulted in structural damage of the topsoil and subsequent capping. Poor aeration ensued which provided a very hostile environment.

Observations From Preliminary Plots

Emergence was delayed until the soil surface dried; capping of the soil surface inhibited emergence of some species, especially in control plots. In spite of these conditions, the most prominent growth was observed from the parts of the mat containing PEO Hydrogel, calcium bentonite and zeolite. Very little growth occurred without the use of the seed mat of the invention It was not possible to ascertain whether there was any effect from the use of the bacterial inoculant, A-100.

Preparation of Seed Mats for Larger Scale Assessments

Seed mats were prepared on the basis of the above observations with PEO Hydrogel, calcium bentonite, zeolite and with and without the inclusion of A-100 bacterial inoculant, applied evenly at 15 g/sq.m. Grass and clover species were mixed before application in rows. Otherwise the manufacturing protocol remained unchanged.

Laying

Strips of the seed mat of the invention were laid on Mar. 17, 2000 and were covered with 10 mm soil. Soil conditions were too wet to attempt to direct seed control plots at the same time. Consequently results were taken from previously seeded areas as part of the initial study.

Results

Emergence of ryegrass species was observed by Mar, 23 (7 days after laying) despite 81 mm rainfall during the intervening period. Assessments were made 20 days after emergence. Plant material was harvested using quadrats (0.25 m×0.25 m). A total of 10 sub samples were taken from each mat. Fresh weights were recorded at the time of sampling and the plant material was then dried at 80° C. for 24 hours. Total dry matter production was assessed 20 days after emergence on April. 14 Results are summarised in Table 10 and shown in detail at Table 11

There was limited, if any, growth of grasses in the saline control plots after 20 days after emergence of the seed mat Ned plots so no it was not possible to harvest and record from the sub-plots.

TABLE 10

Summary of results from 10 m plots

| Site | Treatment | Salinity dS/m | Dry matter g/m$^2$ |
|---|---|---|---|
| Farm site (Laid Mar. 17, 2000) | Seed mat – bacteria | >6 | 32 (± 3.1) |
| Farm site (Laid Mar. 17, 2000) | Seed mat + bacteria | >6 | 19 (± 2.1) |
| Farm site (Sown Jul. 3, 2000) | Direct seeded | <2 | <1 |
| Farm site Sown Jul. 3, 2000) | Direct seeded | >6 | <1 |

In spite of the additional rain following the laying of the matrix (seed mat), growth in the 10 m plots was far better than the direct sown areas with an equivalent level of soil salinity. In one area of the farm site that was higher up a slope, high rainfall had leached the salinity to below 2 dS/m. In this one area, direct seeded treatments had established but in all other control areas no emergence occurred.

TABLE 5

Dry matter production

| Rep no. | Fresh wt (g) | g/sq. m | Dry wt (g) | g DM/sq. m | DM (%) |
|---|---|---|---|---|---|
| Freemans Reach + bacteria | | | | | |
| 1 | 6.4 | 102.4 | 0.6 | 9.6 | 9.4 |
| 2 | 8.3 | 132.8 | 1.0 | 16.0 | 12.0 |
| 3 | 5.7 | 91.2 | 0.5 | 8.0 | 8.8 |

TABLE 5-continued

Dry matter production

| Rep no. | Fresh wt (g) | g/sq. m | Dry wt (g) | g DM/sq. m | DM (%) |
|---|---|---|---|---|---|
| 4 | 12.2 | 195.2 | 1.1 | 17.6 | 9.0 |
| 5 | 13.2 | 211.2 | 1.3 | 20.8 | 9.8 |
| 6 | 14.6 | 233.6 | 1.2 | 19.2 | 8.2 |
| 7 | 16.3 | 260.8 | 1.5 | 24.0 | 9.2 |
| 8 | 16.0 | 256.0 | 1.4 | 22.4 | 8.8 |
| 9 | 20.3 | 324.8 | 1.9 | 30.4 | 9.4 |
| 10 | 15.7 | 251.2 | 1.5 | 24.0 | 9.6 |
| Mean | 13 | 206 | 1 | 19 | 9 |
| Std. Dev | 4.7 | 75.9 | 0.4 | 6.8 | 1.0 |
| Std. Error | 1.5 | 24.0 | 0.1 | 2.1 | 0.3 |
| Freemans Reach – bacteria | | | | | |
| 1 | 33.3 | 532.8 | 2.9 | 46.4 | 8.7 |
| 2 | 26.5 | 424.0 | 2.6 | 41.6 | 9.8 |
| 3 | 21.5 | 344.0 | 2.0 | 32.0 | 9.3 |
| 4 | 22.1 | 353.6 | 2.0 | 32.0 | 9.0 |
| 5 | 24.0 | 384.0 | 2.2 | 35.2 | 9.2 |
| 6 | 26.4 | 422.4 | 2.4 | 38.4 | 9.1 |
| 7 | 13.3 | 212.8 | 1.1 | 17.6 | 8.3 |
| 8 | 25.4 | 406.4 | 2.2 | 35.2 | 8.7 |
| 9 | 14.6 | 233.6 | 1.8 | 28.8 | 12.3 |
| 10 | 10.6 | 169.6 | 0.9 | 14.4 | 8.5 |
| Mean | 22 | 348 | 2 | 32 | 9 |
| Std. Dev | 7.0 | 112.3 | 0.6 | 9.9 | 1.2 |
| Std. Error | 2.2 | 35.5 | 0.2 | 3.1 | 0.4 |

Conclusions

The results demonstrated that the use of the seed matrices (seed mats) of the invention without additives gives a degree of physical protection throughout, but germination is much more effective when a combination of PEO Hydrogel, calcium bentonite and zeolite are included in the mat.

The results also demonstrate that the polyacrylamide gel superabsorbent was relatively ineffective in the saline conditions encountered in this study. This is believed to be the result of phytotoxicity and, possibly, the creation of an anaerobic microclimate within the mat once the gel formed. There is also the risk of salt accumulation within the gel, which in turn will inhibit seed germination.

Burying of the matrix has no detrimental effect on germination and protected emerging seedlings from the effect of heavy rainfall.

The inclusion of the A-100 bacterial inoculant gave no discernible advantage.

Weed control was substantially increased where the seed mat of the invention was laid in comparison to direct seeding.

The foregoing Examples illustrate the advantages of the seed matrices (seed mats) of the invention in both low salinity soils and also higher salinity more hostile conditions.

It will readily be apparent that numerous alternations and modifications could be made to the medium shown in the accompanying drawings and described in the Examples without departing from the principles underlying the invention and all such modifications and alterations are intended to be within the scope of this application.

What is claimed is:

1. A seed germination medium comprising an upper layer which is permeable to gases but substantially impermeable to water in liquid form; a lower layer formed from a water absorbent biodegradable material; and seeds being disposed beneath the upper layer, wherein said upper layer having a plurality of perforations therein to assist disruption of the upper layer to enable seedlings germinating from the seeds to grow therethrough.

2. The seed germination medium of claim 1, wherein said upper layer is composed of a tissue paper having a weight of approximately 10–30 $g/m^2$ and being coated or impregnated with a waterproofing agent such that the tissue paper is permeable to gases but substantially impermeable to water in liquid form.

3. A seed germination medium according to claim 2 wherein the tissue paper is a lightweight material having a weight of from 15 to 25 $g/m^2$ for example from 17 $g/m^2$ to 24 $g/m^2$.

4. A seed germination medium according to claim 2 wherein the tissue paper is a calendered paper.

5. A seed germination medium according to claim 2 wherein the tissue paper is a sulphite paper.

6. A seed germination medium according to claim 2 wherein a water-absorbent substance is disposed between the upper and lower layers.

7. A seed germination medium according to claim 6 wherein the water-absorbent substance is a polyoxethylene gel, for example a cross-linked gel such as a cross-linked polyethylene oxide co-polyurethane hydrogel.

8. A seed germination medium according to claim 2 wherein the tissue paper is coated with a waterproofing material.

9. A seed germination medium according to claim 8 wherein the waterproofing material is a waxy substance.

10. A seed germination medium according to claim 8 wherein the waterproofing material is a polymer which is subject to degradation or erosion under the influence of water, ultraviolet radiation, heat, aerial oxidation, or microbial degradation.

11. A seed germination medium according to claim 2 wherein the upper and lower layers are bonded together by means of an adhesive.

12. A seed germination medium according to claim 11 wherein the adhesive permeates the upper layer and provides waterproofing properties to the upper layer.

13. The seed germination medium of claim 1, wherein said upper layer is a membrane and further comprising, beneath the upper layer, at least one biological agent for encouraging plant development and/or breaking down the upper layer and/or lower layer.

14. A seed germination medium according to claim 13 wherein the biological agents are microbial species selected from bacteria and fungi.

15. A seed germination medium according to claim 13 wherein the biological agents are capable of degrading polysaccharides such as cellulose and starch.

* * * * *